(12) United States Patent
Sun

(10) Patent No.: US 11,782,846 B2
(45) Date of Patent: Oct. 10, 2023

(54) DIGITAL SIGNAL PROCESSOR, DSP SYSTEM, AND METHOD FOR ACCESSING EXTERNAL MEMORY SPACE

(71) Applicant: ZTE Corporation, Shenzhen (CN)

(72) Inventor: Xueting Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/296,249

(22) PCT Filed: Sep. 24, 2019

(86) PCT No.: PCT/CN2019/107429
§ 371 (c)(1),
(2) Date: May 23, 2021

(87) PCT Pub. No.: WO2020/103568
PCT Pub. Date: May 28, 2020

(65) Prior Publication Data
US 2022/0019543 A1 Jan. 20, 2022

(30) Foreign Application Priority Data
Nov. 23, 2018 (CN) .......................... 201811409034.0

(51) Int. Cl.
*G06F 12/1045* (2016.01)
*G06F 11/07* (2006.01)
(Continued)

(52) U.S. Cl.
CPC ...... *G06F 12/1054* (2013.01); *G06F 11/0772* (2013.01); *G06F 11/142* (2013.01);
(Continued)

(58) Field of Classification Search
CPC . G06F 12/1054; G06F 13/1668; G06F 12/163
See application file for complete search history.

(56) References Cited

U.S. PATENT DOCUMENTS

| 6,430,664 B1 | 8/2002 | Chauvel et al. |
| 7,017,025 B1 | 3/2006 | Kissell |

(Continued)

FOREIGN PATENT DOCUMENTS

| CN | 1731371 A | 2/2006 |
| CN | 201570016 U | 9/2010 |

(Continued)

OTHER PUBLICATIONS

European Patent Office. Extenided European Search Report for EP Application No. 19886109.8, dated Oct. 8, 2021, pp. 1-8.

(Continued)

*Primary Examiner* — Baboucarr Faal
(74) *Attorney, Agent, or Firm* — Vivacqua Crane, PLLC

(57) ABSTRACT

A digital signal processor, a digital signal processing (DSP) system, and a method for accessing external memory space are disclosed. The digital signal processor may include: a digital signal processing (DSP) core; and a program port and a data port which are connected to the DSP core and configured to access an external memory, where the program port and the data port are respectively configured to communicate with a memory management unit configured for management of an access address.

13 Claims, 6 Drawing Sheets

(51) Int. Cl.
  *G06F 11/14* (2006.01)
  *G06F 12/02* (2006.01)
  *G06F 13/16* (2006.01)

(52) U.S. Cl.
  CPC ...... *G06F 12/0246* (2013.01); *G06F 12/1063* (2013.01); *G06F 13/1668* (2013.01)

(56) References Cited

U.S. PATENT DOCUMENTS

| | | | |
|---|---|---|---|
| 7,509,391 B1 | 3/2009 | Chauvel et al. | |
| 2002/0078319 A1* | 6/2002 | Chauvel | G06F 12/1027 711/206 |
| 2003/0204702 A1* | 10/2003 | Lomax, Jr. | G06F 12/0888 711/202 |
| 2005/0193081 A1* | 9/2005 | Gruber | G06F 15/16 709/212 |
| 2014/0195742 A1 | 7/2014 | Kim et al. | |
| 2018/0225238 A1* | 8/2018 | Karguth | G06F 13/4282 |

FOREIGN PATENT DOCUMENTS

| CN | 103914405 A | 7/2014 |
|---|---|---|
| CN | 104750603 A | 7/2015 |
| EP | 1139222 A1 | 10/2001 |
| EP | 1067461 B1 | 4/2013 |

OTHER PUBLICATIONS

International Search Report and Written Opinion for the International Patent Application No. PCT/CN2019/107429 dated Dec. 31, 2019.
The State Intellectual Property Office of People's Republic of China. First Office Action for CN Application No. 2018114090340 and English translation, dated Dec. 5, 2022, pp. 1-16.
The State Intellectual Property Office of People's Republic of China. First Search Report for CN Application No. 2018114090340 and English translation, dated Nov. 24, 2022, pp. 1-5.
Liu, et al. "DSP Technology Principle and Application Course," Beihang University Press, Chapter 11, 4th ed., Aug. 2018, and English translation, pp. 1-6.
The State Intellectual Property Office of People's Republic of China. Decision on Rejection for CN Application No. 201811409034.0 and English translation, dated Apr. 23, 2023, pp. 1-12.
European Patent Office. Communication pursuant to Article 94(3) EPC for EP Application No. 19886109.8, dated Aug. 2, 2023, pp. 1-9.
Smith, S. "The Scientist and Engineer's Guide to Digital Signal Processing," Second Edition, Jan. 1999, pp. 1-688.

* cited by examiner

DIGITAL SIGNAL PROCESSOR, DSP SYSTEM, AND METHOD FOR ACCESSING EXTERNAL MEMORY SPACE

CROSS-REFERENCE TO RELATED APPLICATION

This application is a national stage filing under 35 U.S.C. § 371 of international application number PCT/CN2019/107429, filed Sep. 24, 2019, which claims priority to Chinese patent application No. 201811409034.0, filed Nov. 23, 2018. The contents of these applications are incorporated herein by reference in their entirety.

TECHNICAL FIELD

This application relates to, but not limited to, the field of digital signal processing (DSP), and in particular, to a digital signal processor, a DSP system, and a method for accessing external memory space.

BACKGROUND

In the communication system, a digital signal processor is generally designed as a complex algorithm processing unit with high computing speed and high performance, and adopts Haval architecture with data bus and address bus separated, which allows fetching of instructions and data at the same time in one clock cycle, and increases the performance of the core. Generally, the processor accesses an external memory directly by a physical address without any translation.

However, for the increasingly large communication system, if more users and more traffic are to be supported, more digital signal processors are needed to be integrated. In some circumstances, off-chip memory space is needed to be divided for a large number of respective digital signal processors, which leads to a need to design a complex off-chip memory space allocation scheme, and raises a risk of digital signal processors stomping on one off-chip memory, thus increases the maintenance cost of a whole system.

Memory management unit (MMU) is used for multi-core digital signal processors introduced by the industry. When accessing the off-chip memory space, usually both the program port and the data port pass through a unified MMU. In this way, the operations of fetching instructions and data are actually carried out in serial in the MMU module (Von Neumann structure), which may reduce the system efficiency.

SUMMARY

Embodiments of the present disclosure provide a digital signal processor, a DSP system, and a method for accessing external memory space.

According to an aspect of the present disclosure, there is provided a digital signal processor, may including: a digital signal processing (DSP) core; and a program port and a data port which are connected to the DSP core and configured to access an external memory, where the program port and the data port are respectively configured to communicate with a memory management unit configured for management of an access address.

According to another aspect of the present disclosure, there is provided a DSP system, may including: an external memory including an on-chip memory and/or an off-chip memory; and at least one digital signal processor according to above embodiment, where the digital signal processor is connected to the external memory through a system bus.

According to yet another aspect of the present disclosure, there is provided a method for accessing an external memory based on the above DSP system, may including: translating, by a memory management unit, an access virtual address issued by a DSP core into a physical address according to a stored access address translation table; transparently transmitting the physical address to a bus interconnected to the external memory to access the external memory.

In the above embodiments of the present disclosure, since the program port and the data port are respectively configured to communicate with a memory management unit for management of an access address, an operation of fetching instructions and an operation of fetching data can be carried out in parallel, thereby improving the efficiency of the DSP system.

BRIEF DESCRIPTION OF DRAWINGS

The accompanying drawings described herein are intended to provide a further understanding of the present disclosure and form part of the present application, and the illustrative embodiments of the present disclosure and the description thereof are intended to explain the present disclosure and do not constitute undue limitations on the present disclosure. In the drawings.

DETAILED DESCRIPTION

Hereinafter, the present disclosure will be described in detail with reference to the drawings and in connection with the embodiments. It should be noted that the embodiments of the present application and the features in the embodiments may be combined to derive other embodiments not explicitly described.

Figure 1:
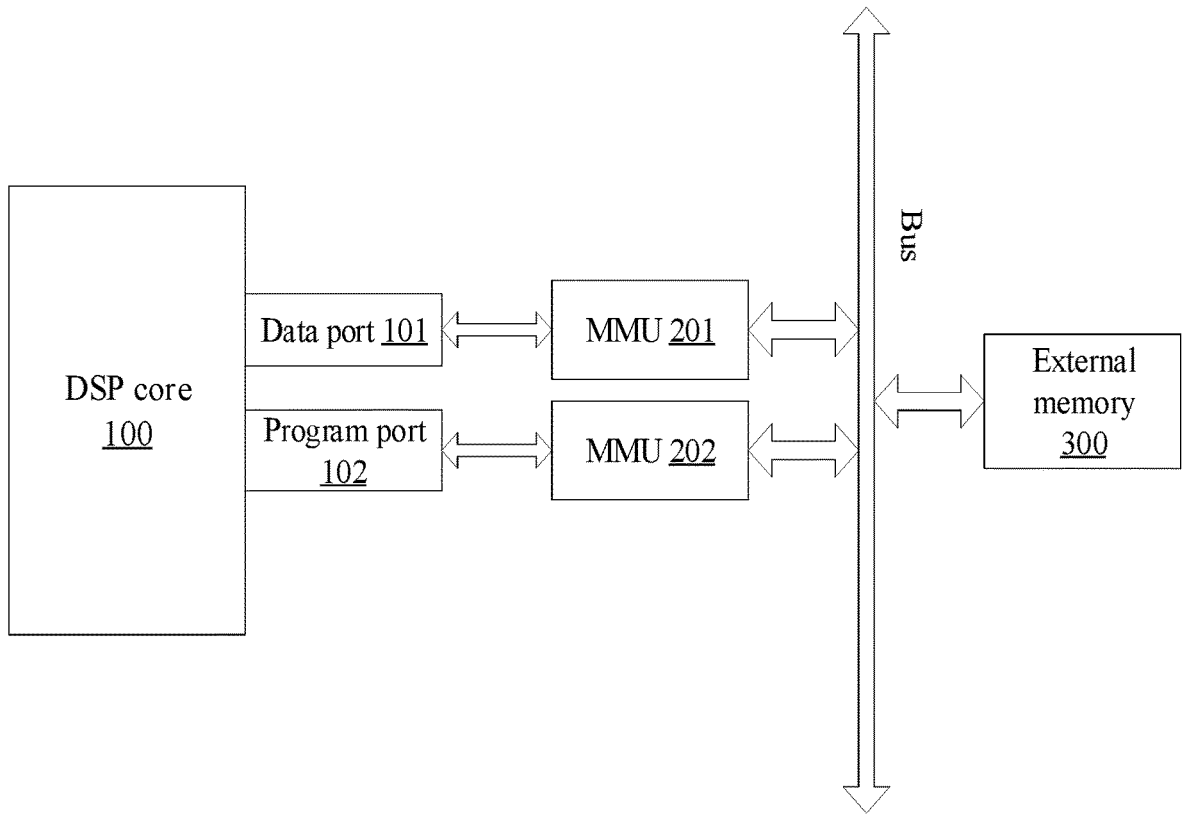
FIG. 1 is a structural block diagram of a digital signal processor according to an embodiment of the present disclosure.

According to an embodiment of the present disclosure, a digital signal processor is provided. As shown in FIG. 1, the digital signal processor includes a DSP core, and a program port and a data port which are configured to access an external memory, where the program port and the data port are respectively configured to communicate with a memory management unit for management of an access address.

In this embodiment, the DSP core accesses the external memory through the program port and the data port, where the program port is configured to fetch instructions and the data port is configured to fetch data. The memory management unit is configured to manage an address accessed by the DSP core, for example, to translate an access virtual address issued by the DSP core into a physical address, and to detect a configuration error of the address and report error information to the DSP core.

In this embodiment, each component may be connected through a bus. The accessed external memory may be an on-chip memory or an off-chip memory.

In this embodiment, since the program port and the data port are respectively configured to communicate with a memory management unit for management of an access address, fetching of instructions and data by the program can be processed in parallel through respective memory management unit with high efficiency.

Figure 2:
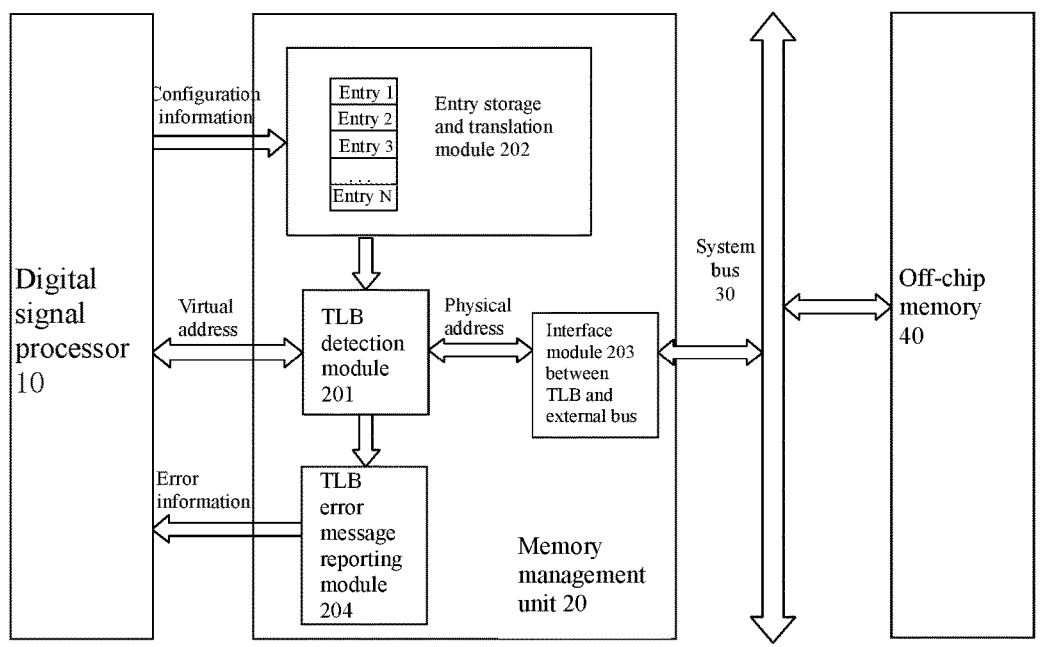
FIG. 2 is a structural block diagram of a DSP system according to an embodiment of the present disclosure.

As shown in FIG. 2, according to an embodiment of the present disclosure, a DSP system is provided, including the following modules: a digital signal processor 10, a memory management unit 20, a system bus 30 and an external memory 40. In this embodiment, only one digital signal processor is shown. Of course, the DSP system in this embodiment may also include a plurality of digital signal processors. In the case where a plurality of digital signal processors are included, the connection mode between the digital signal processors and other components is similar to the connection mode where only one digital signal processor is included. The specific structure and connection relationship of the components are as follows.

The digital signal processor 10 includes a DSP core, one or more data ports and one or more program ports, and may also include an on-chip memory space and a cache (not shown).

An independent memory management unit 20 is added to each data port and program port outside the DSP core, so that when each DSP core accesses the external memory 40, fetching of instruction and data by the program can be processed in parallel through respective memory management unit, and the efficiency is high.

In addition, memory management units communicated to the ports are designed separately, so that each of the units only focuses on the address translation of the port corresponding to this unit, without the need for judgment of port type, which makes the hardware design simpler.

After using the memory management unit, the memory of each DSP core may be explicitly expressed as a memory configuration table, which makes it more convenient to design the multi-core memory layout by software.

If a symmetrical software design is adopted, the virtual memory seen by each DSP software is the same, so that a compiled file may be applied to multiple cores. The cost of maintaining multiple compiled projects is reduced exponentially, and the time of making versions is greatly shortened.

The functions of each of the memory management units include, but are not limited to, mapping a virtual access address to an actual physical address according to a configured table entry and mode, protecting an address segment with permission, and supporting a detection and reporting for some configuration errors of the access address and entry.

In a configured table entry of the memory management unit, a function such as readable, writable and valid attributes of a certain segment address may be set, which restricts the off-chip access issued by the DSP core and limits illegal access, thus improving the stability of the whole software system.

The memory management unit 20 may include a detection module 201, an entry storage and translation module 202, a bus interface module 203, and an error reporting module 204. To simplify the description, the memory management unit will be referred to as a translation lookaside buffer (TLB) unit hereinafter.

In some embodiments, the detection module is configured to search the TLB entry storage module according to the virtual address issued by the DSP core, find an entry corresponding to a physical address and detect various configuration errors.

In some embodiments, the entry storage and translation module is configured to store an address translation table and translate a virtual address issued by the DSP core into a physical address based on the configuration table according to the address translation table.

In some embodiments, the number of entries in the address translation table may be fixed. Since the number of entries of the memory management unit is fixed and the memory space is integrated in the hardware, the time of reading entries in the hardware is reduced, and the efficiency of accessing the off-chip memory by the digital signal processor is not affected.

In some embodiments, the bus interface module is configured to transparently transmit the translated physical address signal and other bus signals to a next level bus.

In some embodiments, the error reporting module is configured to report abnormal information to the DSP core when the detection module detects an error.

In this embodiment, the memory management unit can meet the requirements of different products, and the related memory management units can be enabled and disabled according to the requirements of different products. For example, only the memory management unit of the data port may be enabled, or when there are a plurality of data ports, one memory management unit may be enabled for each port, and the same characteristics may be used for the access to the program port. In this embodiment, since each memory management unit supports enabling and disabling, it is suitable for low power consumption design.

In this embodiment, the external memory refers to a memory accessed through the memory management unit, which does not belong to the memory of the digital signal processor, but may be located inside or outside the chip, and may be a double data rate synchronous dynamic random access memory (DDR SDRAM, which may be shortened as DDR) connected by a memory controller (for example, DDR controller), etc.

The bus system is configured to connect each memory management unit, external memory space, other core sub-systems and other peripherals to realize the interconnection of chips.

Figure 3:
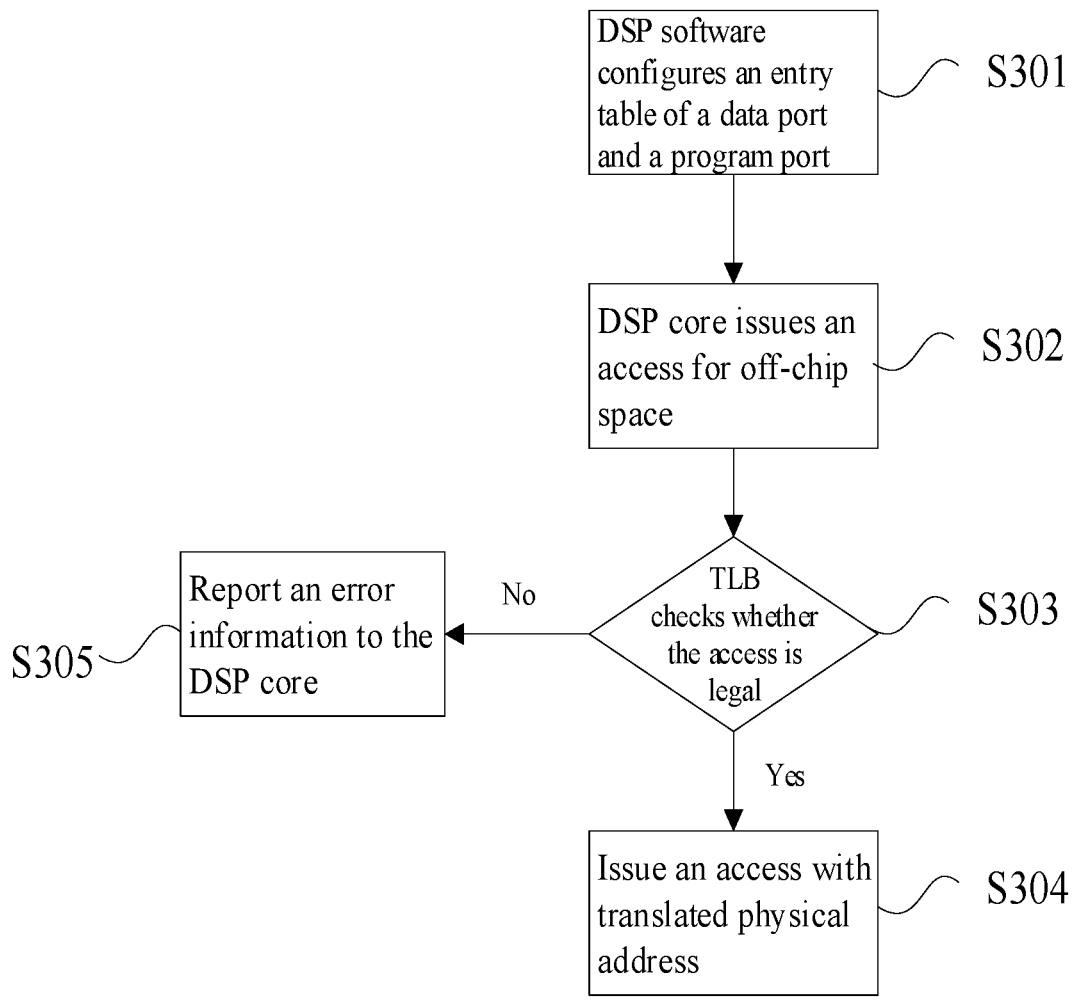
FIG. 3 is a flowchart of accessing an external memory according to an embodiment of the present disclosure.

Based on the above DSP system, a method for accessing an external memory is also provided. In this embodiment, an appropriate number of memory management units may be added to the program ports and the data ports as required at the time of hardware design, and then connected to the bus and connected to the external memory space through the buses at all levels. If a port does not actually need to add the memory management unit, it may be bypassed. As shown in FIG. 3, the method according to this embodiment includes the following steps of S301 to S305.

In a step of S301, an entry table of a memory management unit may be configured by software, and configuration items include a virtual address and a corresponding physical address, an access length, and a memory access permission, etc.

In a step of S302, the DSP core issues a program access, and the detection module of the memory management unit of a corresponding program interface resolves an instruction address signal. The DSP core issue a data access, and the detection module of the memory management unit of the corresponding data interface resolves a data address signal.

According to actual requirements, there may be a plurality of data ports, each of which may have a different bus bandwidth, so one memory management unit may be configured for each of the data ports and configured to be adapted to different bandwidths, and each data port and program port may issue access requests in parallel.

In a step of S303, the memory management module unit queries whether a to-be-accessed virtual address is within a certain range of entries in the entry table.

In a step of S304, if the to-be-accessed virtual address is hit in the entry table, the to-be-accessed virtual address is translated into a physical address, and an external memory access request is issued through the interface between the memory management module and the external bus.

In a step of S305, if the to-be-accessed virtual address is not hit in the entry table or an access permission is incorrect, corresponding error information/time is fed back to the DSP core.

Example Embodiment One

Figure 4:
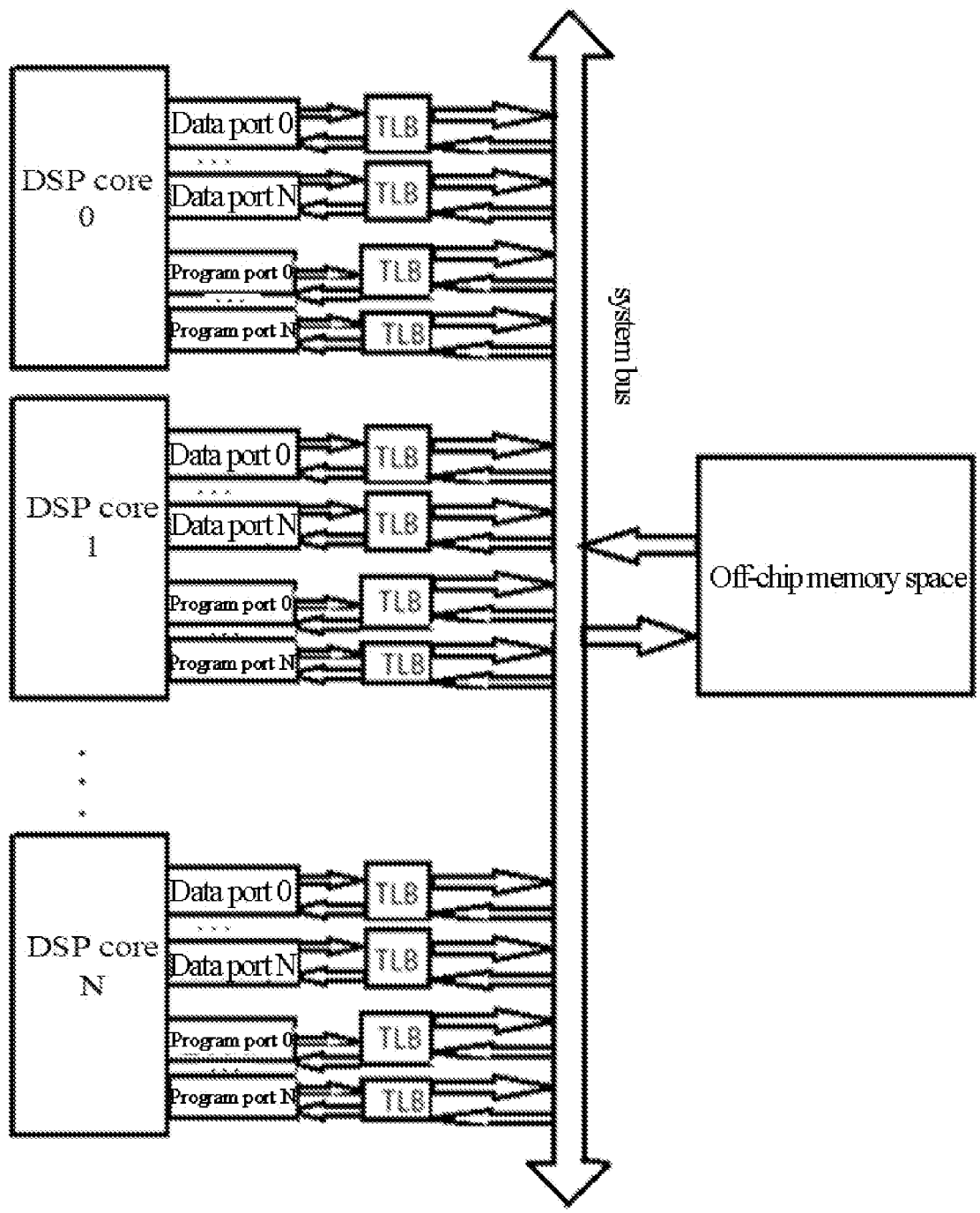
FIG. 4 is a schematic diagram of accessing an external memory according to embodiment one of the present disclosure.

As shown in FIG. 4, in this embodiment, the digital signal processor in the DSP system includes a plurality of DSP cores, and each of the DSP cores has a plurality of program ports and data ports for accessing the off-chip memory space, where each of the program ports and the data ports is provided with a TLB unit.

The entry table of the TLB unit may be configured by software before the DSP core accesses the off-chip memory. The configuration items may include a virtual address and a corresponding physical address, an access length, a memory access permission, etc. The readable, writable, valid and other attributes of an address segment may be set.

When the DSP core issues an access request, the TLB unit detection module resolves an address signal, and the address is a virtual address for the TLB unit.

The TLB unit queries whether the virtual address is within a certain range of entries in the entry table, if hit, the virtual address is translated into a physical address, and an access request is issued through the interface between the TLB unit and the external bus. If the virtual address is not hit or the access permission is incorrect, corresponding error information is fed back to the DSP core.

Example Embodiment Two

Figure 5:
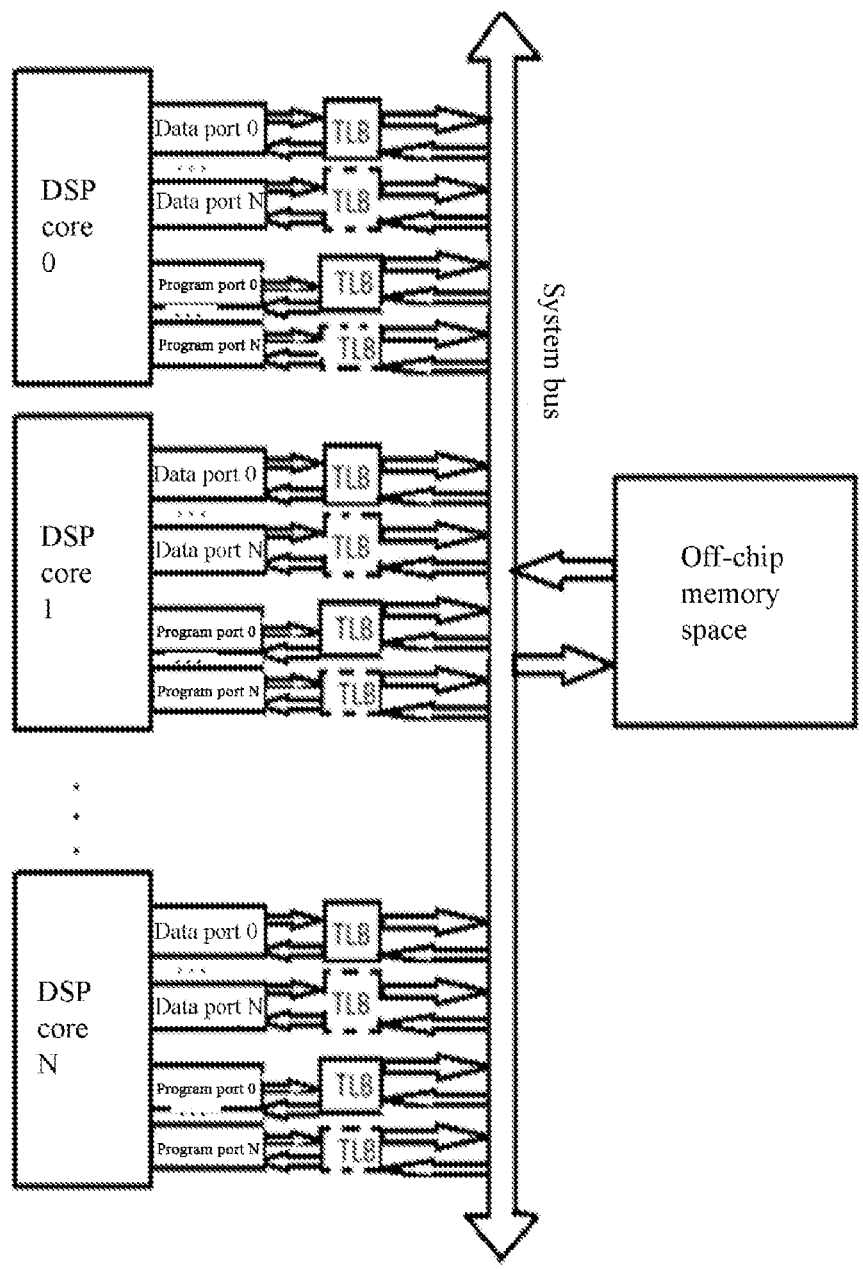
FIG. 5 is a schematic diagram of accessing an external memory according to embodiment two of the present disclosure.

As shown in FIG. 5, in this embodiment, the TLB unit may be set to a bypass mode in cases where address translation is not required for some ports.

First, the TLB units (shown by dotted lines in FIG. 5) for some ports are set to a bypass mode according to actual needs.

Before the DSP core accesses the off-chip space, the software configures the entry table of the TLB unit for each port, and the configuration items include a virtual address and a corresponding physical address, an access length, a memory access permission, etc.

When the DSP core issues an access request (each data port and program port may issue an access request in parallel), the TLB detection unit resolves an address signal, and the address is a virtual address for the TLB unit.

The TLB unit queries whether the virtual address is within a certain range of entries in the entry table, if hit, the virtual address is translated into a physical address, and an access request is issued through the interface between the TLB unit and the external bus. If the virtual address is not hit or the access permission is incorrect, corresponding error information is fed back to the DSP core.

Example Embodiment Three

Figure 6:
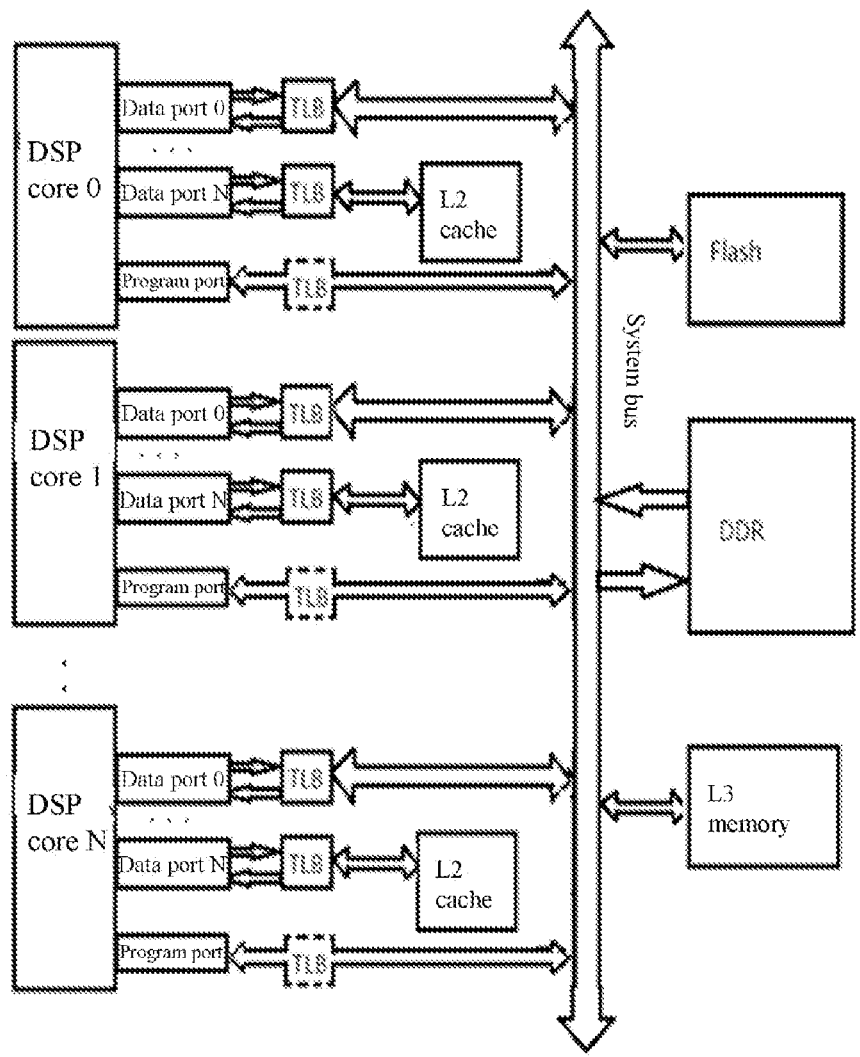
FIG. 6 is a schematic diagram of accessing an external memory according to embodiment three of the present disclosure.

As shown in FIG. 6, in this embodiment, the digital signal processor has a plurality of data ports each configured with a different bus bit width. Some of the data ports are connected to a low-speed memory, for example, a DDR memory, a Flash memory, or an L3 memory, etc. Some of the data ports are connected to a high-speed memory, for example, an L2 cache. Different bit widths may be adopted by setting the TLB units.

Before the DSP core accesses each memory, the software configures the entry table of the TLB unit for each port, and the configuration items include a virtual address and a corresponding physical address, an access length, a memory access permission, etc.

When the DSP core issues an access request (each data port and program port may issue an access request in parallel), the TLB detection unit resolves an address signal, and the address is a virtual address for the TLB unit.

The TLB unit queries whether the virtual address is within a certain range of entries in the entry table, if hit, the virtual address is translated into the physical address of the corresponding memory, and an access request is issued through the interface between the TLB unit and the external bus. If the virtual address is not hit or the access permission is incorrect, corresponding error information is fed back to the DSP core.

Example Embodiment Four

Figure 7:
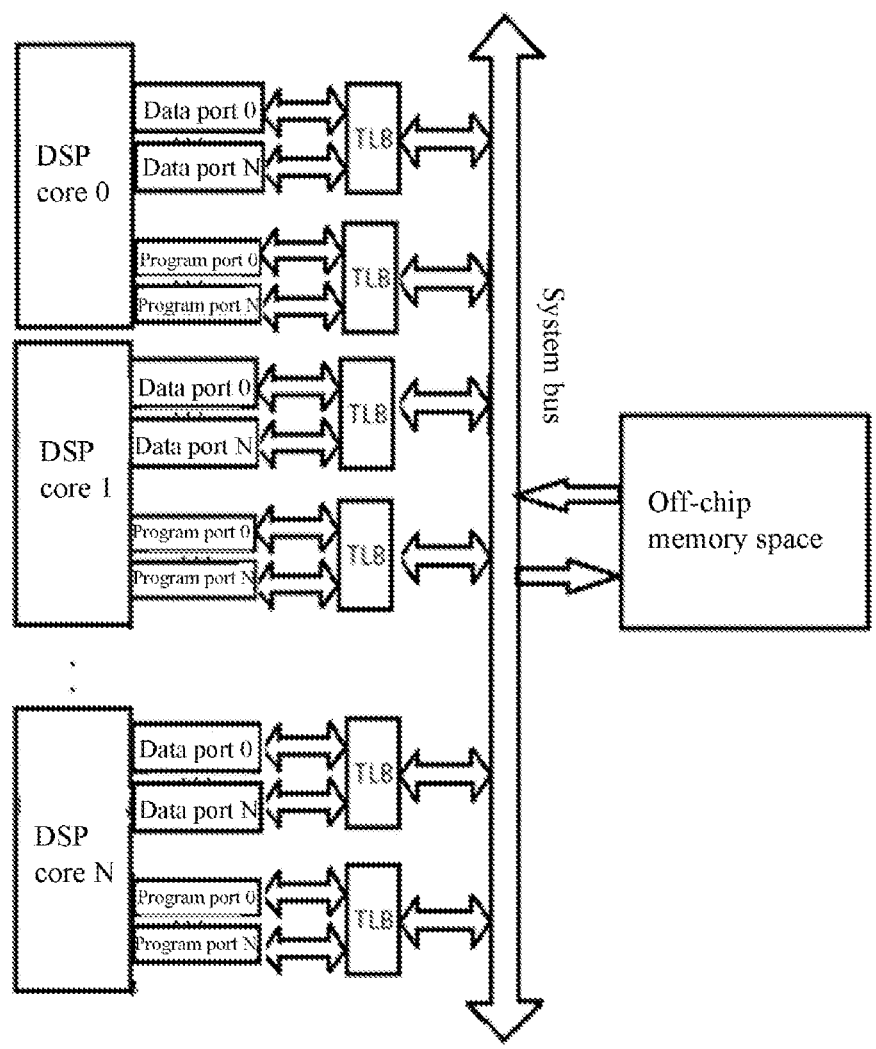
FIG. 7 is a schematic diagram of accessing an external memory according to embodiment four of the present disclosure.

As shown in FIG. 7, in this embodiment, a DSP core has a plurality of data ports connected to one TLB unit and a plurality of program ports connected to another TLB unit, and entries corresponding to each port are distinguished through port IDs in the TLB unit. For example, the TLB unit may number each port sequentially from 0.

In this embodiment, before the DSP core accesses the off-chip space, the entry table of TLB unit for each port may be configured by software, and the configuration items include a port ID, a virtual address and a corresponding physical address, an access length, a memory access permission, etc.

When the DSP core issues an access request, the TLB detection unit resolves an address signal, and the address is a virtual address for the TLB unit.

Then, the TLB unit queries whether the virtual address is within a certain range of entries in the entry table, if hit, the virtual address is translated into a physical address, and an access request is issued through the interface between the TLB unit and the external bus. If the virtual address is not hit or the access permission is incorrect, corresponding error information is fed back to the DSP core.

The foregoing description includes several embodiments of the present disclosure and are not intended to limit the present disclosure. Various modifications and changes may be made to the present disclosure by those having ordinary skills in the art. Any modifications, equivalent substitutions, improvements, etc. made according to the principles of the present disclosure shall fall into the scope of the present disclosure defined by the appended claims.

The invention claimed is:

1. A digital signal processor, comprising:
   a digital signal processing (DSP) core; and
   a program port and a plurality of data ports which are connected to the DSP core and configured to access an external memory, wherein each of the data ports is configured with a different bus bit width, wherein the program port is configured to communicate with a first memory management unit configured for management of an access address and each of the data ports is configured to communicate with a second memory management unit configured for management of an access address, and the second memory management unit is configured to be adapted to a different bus bit width for each of the data ports.

2. The digital signal processor of claim 1, wherein the first or second memory management unit comprises:
   an address storage and translation module, configured to store an access address translation table and translate an access virtual address issued by the DSP core into a physical address according to the access address translation table; and
   an interface module, configured to transparently transmit the physical address to a bus interconnected to the external memory.

3. The digital signal processor of claim 2, wherein the first or second memory management unit further comprises:
   a detection module, configured to search an entry corresponding to a physical address in the access address translation table according to the access virtual address issued by the DSP core, and to detect a configuration error; and
   an error reporting module, configured to report error information to the DSP core in response to detection of a configuration error by the detection module.

4. The digital signal processor of claim 3, wherein the access address translation table has a fixed number of entries and comprises at least one of following configuration items:
   a virtual address and a corresponding physical address, an address access length, and an address access permission.

5. The digital signal processor of claim 1, wherein:
   the plurality of data ports share a same second memory management unit, wherein the data ports sharing the same second memory management unit are configured with different port numbers.

6. The digital signal processor of claim 5, comprising:
   a plurality of program ports, which share a same first memory management unit, wherein the program ports sharing the same first memory management unit are configured with different port numbers.

7. The digital signal processor of claim 1, comprising:
   a plurality of program ports, which share a same first memory management unit, wherein the program ports sharing the same first memory management unit are configured with different port numbers.

8. The digital signal processor of claim 1, wherein the first or second memory management unit supports a switching between an enabled state and a disabled state, wherein in the disabled state, the first or second memory management unit does not translate a virtual address into a physical address, and directly bypasses an access address issued by the DSP core to a bus.

9. A digital signal processing (DSP) system, comprising:
   an external memory, comprising an on-chip memory and/or an off-chip memory; and
   at least one digital signal processor connected to the external memory through a system bus, wherein the digital signal processor comprises: a DSP core; and
   a program port and a plurality of data ports which are connected to the DSP core and configured to access an external memory, wherein each of the data ports is configured with a different bus bit width, wherein the program port is configured to communicate with a first memory management unit configured for management of an access address and each of the data ports is configured to communicate with a memory management unit configured for management of an access address, and the second memory management unit is configured to be adapted to a different bus bit width for each of the data ports.

10. A method for accessing an external memory based on a digital signal processing (DSP) system, wherein:
    the DSP system comprises:
    an external memory, comprising an on-chip memory and/or an off-chip memory; and
    at least one digital signal processor connected to the external memory through a system bus, wherein the digital signal processor comprises:
    a DSP core; and
    a program port and a plurality of data ports which are connected to the DSP core and configured to access an external memory, wherein each of the data ports is configured with a different bus bit width, wherein the program port is configured to communicate with a first memory management unit configured for management of an access address and each of the data ports is configured to communicate with a second memory management unit configured for management of an access address, and the second memory management unit is configured to be adapted to a different bus bit width for each of the data ports;
    the method comprises:
    translating, by the first or second memory management unit, an access virtual address issued by a DSP core into a physical address according to a stored access address translation table;
    transparently transmitting the physical address to a bus interconnected to the external memory to access the external memory.

11. The method of claim 10, wherein the access address translation table has a fixed number of entries and comprises at least one of following configuration items:
    a virtual address and a corresponding physical address, an address access length, and an address access permission.

12. The method of claim 11, wherein before accessing, by the DSP core, the external memory, the method further comprises:
    configuring the at least one of the configuration items for the entries in the access address translation table.

13. The method of claim 12, further comprising:
    searching an entry corresponding to a physical address in the access address translation table according to the access virtual address issued by the DSP core, and detecting a configuration error; and
    reporting an error information to the DSP core in response to detection of a configuration error.

* * * * *